(12) United States Patent
Krupin et al.

(10) Patent No.: US 6,751,611 B2
(45) Date of Patent: Jun. 15, 2004

(54) METHOD AND SYSTEM FOR CREATING IMPROVED SEARCH QUERIES

(76) Inventors: Paul Jeffrey Krupin, 2404 S. Lyle St., Kennewick, WA (US) 99337; Donald Roy Short, 415 N. Quay, Bldg. B, Kennewick, WA (US) 99336

( * ) Notice: Subject to any disclaimer, the term of this patent is extended or adjusted under 35 U.S.C. 154(b) by 0 days.

(21) Appl. No.: 10/376,818

(22) Filed: Feb. 28, 2003

(65) Prior Publication Data

US 2003/0172061 A1 Sep. 11, 2003

Related U.S. Application Data

(60) Provisional application No. 60/361,504, filed on Mar. 1, 2002.

(51) Int. Cl.[7] ............................................. G06F 17/30
(52) U.S. Cl. ..................... 707/3; 707/2; 707/4; 707/5; 345/772
(58) Field of Search .................... 707/2–5; 345/772

(56) References Cited

U.S. PATENT DOCUMENTS

| | | | | |
|---|---|---|---|---|
| 6,014,662 A | * | 1/2000 | Moran et al. | 707/3 |
| 6,029,192 A | * | 2/2000 | Hill et al. | 709/206 |
| 6,189,003 B1 | * | 2/2001 | Leal | 707/2 |
| 6,292,796 B1 | * | 9/2001 | Drucker et al. | 707/5 |
| 6,302,698 B1 | * | 10/2001 | Ziv-El | 434/323 |
| 6,345,273 B1 | * | 2/2002 | Cochran | 707/4 |
| 6,510,406 B1 | * | 1/2003 | Marchisio | 704/9 |
| 6,513,031 B1 | | 1/2003 | Fries et al. | |
| 6,519,586 B2 | * | 2/2003 | Anick et al. | 707/3 |
| 6,523,021 B1 | * | 2/2003 | Monberg et al. | 707/2 |

* cited by examiner

Primary Examiner—Wayne Amsbury
Assistant Examiner—Cam-Linh T. Nguyen
(74) Attorney, Agent, or Firm—Glenn C. Brown, P.C.

(57) ABSTRACT

A method and system for creating improved search queries using pre-arranged controlled vocabularies, word groups, and word types. The invention is called a search builder. The search builder is a server-based program, which houses numerous individual topic oriented search builder modules. Each module is focused on a special topic of interest. Each search builder module leads users through a series of word groups, where a user may select words to be added to a query, which will ultimately be sent to a search engine or searchable database.

16 Claims, 8 Drawing Sheets

METHOD AND SYSTEM FOR CREATING IMPROVED SEARCH QUERIES

CROSS-REFERENCE TO RELATED APPLICATION

This is a continuation of U.S. provisional patent application No. 60/361,504, filed on Mar. 1, 2002. The priority of the prior application is expressly claimed and its disclosure is hereby incorporated by reference in its entirety.

FIELD OF THE INVENTION

The present invention relates in general to Internet and intranet web page service providers and, in particular, to systems and methods for creating search word queries for use with online search engines and searchable content rich databases.

BACKGROUND OF THE INVENTION

1. Technical Field

The invention is a method and system for creating improved search queries using pre-arranged controlled vocabularies, carefully selected topics, carefully selected word groups, and carefully selected word types. The invention is called a search builder. The search builder is a server-based program, which houses numerous individual topic oriented search builder modules. Each module is focused on a special topic of interest. Each module helps people select the exact terms to be used in a search query. The search query is then transmitted to a search engine or searchable database.

The field of search engines is fairly well known. Common search engines include those developed by Google, Verity, Inc., Alta Vista, Fast, Inc., and Lycos. By using a search engine, a user can retrieve needed information on a focused area of interest. The search engine typically retrieves documents satisfying the specified terms in a search query. A browser program is typically used to access the Internet and the myriad of web sites and search engines that are commonly available. Web browsers are also commonly used to access corporate, government or private intranets. The typical web browser includes provisions for navigating a web site through a graphical user interface used for both transmitting and receiving search queries, and presenting search query results. Web browsers can be found in a variety of commercial formats (Internet Explorer, Netscape, Mozilla, etc).

A typical search query input by a user is processed by an online search engine, which then access an indexed database of web pages which are sent back to the user in the form of a list of ranked web pages that respond to the users query words, based on some algorithm used by the search engine to rank and order results. The quality of the search results is dependent upon the words that are entered into the search engine.

Most search engines do not provide help or guidance in selecting the specific words to be used in the selection of the words used in a query. They typically present a graphical interface advanced search form with empty text boxes and written guidance in text on using the advanced search options, which describes the use of Boolean logic and technical syntax.

Most search engine users tend to use very few words in their search query. Most search word queries submitted by users of search engines contain only one or two words. This produces excessive results with large numbers of web sites that contain irrelevant information. It is difficult for a user to formulate a specific query capable of producing relevant results without the user having a more detailed knowledge of a given search topic or subject area. The difficulty is even more acute when a person of lay knowledge searches in a subject area containing technical terminology, knowledge, data, acronyms, or jargon. They simply do not know the language of the field to search effectively and efficiently. Even with expert and experienced knowledgeable users, they may know the field, but they may not appreciate or understand the differences between search engines, the nuances of advanced search that exists between search engines, that certain search engines and databases are better than others, or that getting better results requires use of specific syntax.

2. Description of the Related Art

There is little related prior art that specifically focuses on improving search query word selection.

Within the realm and spectrum of existing search engines, there are generally two types of search query options: simple search and advanced search. With a simple search, the user is presented a single search box consisting of a data entry form known as a text box in which one or more words may be entered.

With advanced search, the user is presented with one or more text boxes, and is given instructions on what will happen if the user enters a search word. With some advanced search engines options, the user is given a drop down menu that instructs the search engine to use certain Boolean operatives on whatever words are entered in the text box. Thus at Google.com, and most every popular search engine on the Internet, the general search option is simply a blank text box. The advanced search options allow a user to enter words of choice and the search will be conducted on "all the words", "with any of the words", as an "exact phrase" or with "none of the words". The search may also be conducted in any language or in a specified language, of in any file format, or on a specific file format, or within some specified time frame. The advanced search options at most of the search engines all focus on what is done with the words that are entered, rather than on what words are selected in the first place.

One new and recent innovation is clustering which assists users who enter search queries by surveying the indexed listing of web site results and summarizing the topics that the results cover, suggesting related terms and new directions for a follow on search, which can then be clicked on to get more results. The Alta Vista Prisma, and Vivisimo are examples of search engines and search tools that use this type of technology. These programs analyze and operate on the results of the web search, rather than on the query words themselves. Some programs search through the results from a search and create a summary listing of the metadata terms found in the search. They bring this back to the user to help them reiterate a better search.

A slightly different prior art approach focuses on analyzing the content of web pages and results that result from a search query from multiple search engines. Available search tools still do not help users select the words to use in queries but rather take whatever words are used and use metasearch tools to organize and cluster results from one or more search engines or searchable databases. (examples, Vivisimo, Copenic, Bullseye by Intelliseek).

Search engine expert Avi Rappaport has conducted extensive research on search tools and addressed various aspects of the field of queries. The most relevant developments are in the field known as faceted metadata search. In a recent paper she wrote:

Metadata is information about information: more precisely, it's structured information about resources. This can be a single set of hierarchical subject labels, such as a Yahoo or Open Directory Project category. More often, the metadata has several facets: attributes in various orthogonal sets of categories. This is often stored in database record fields and tables, especially for product catalogs. The current spectrum of web sites that utilize faceted metadata include:

- Music stores: songs have attributes such as artist, title, length, genre, date . . .
- Recipes: cuisine, main ingredients, cooking style, holiday . . .
- Travel site: articles have authors, dates, places, prices . . .
- Regulatory documents: product and part codes, machine types, expiration dates . . .
- Image collection: artist, date, style, type of image, major colors, theme . . . . In each of these cases however, there is no single way to provide navigation for everyone: users have such disparate needs. One person might want to look through all the U2 albums, while another is looking for classical guitar or 1940s jazz releases.

Other approaches to structured data access methods include Parametric Search Traditional field-based or parametric search engines for structured data which have used a command line or provided a form to fill out, and Advanced Search. These require a lot of knowledge on the searcher's side; the searcher must know the values or choose from a popup menu. If they include too many parameters, they will probably not find any records that match their requirements—a dead end. The possible values are hidden from the searcher, so all the work the editorial staff has done in defining and assigning attributes is lost.

Full text search engines are another approach Full text search engines can index all HTML metadata or gather data from multiple database fields or tables. Full text search wipes out the value of the metadata: a number 3 is just a number, not a size, price, product ID or other meaningful number, as it is in context of the tagged page or database record. Similarly, it's hard to know whether a recipe, for example, has chili pepper as a significant ingredient or minor flavoring. While many searches are just fine without that information, there are other cases where providing that context would be extremely helpful. Ms Rappaport has also reviewed the present status of Faceted Metadata Search Resources and identifies work in progress by various organizations.

UC Berkeley professor Marti Hearst is investigating how faceted metadata can provide a dynamic information-architecture context for browsing and searching on web sites. Ms. Rappaport and her colleagues have surveyed and discussed the development of search tools but none have identified or developed a search tool like the present invention. The closest working models identified to date are for product databases and not for search engines or searchable databases.

Mr. Lou Rosenfeld, has also surveyed search engine tools and technology, recently observed that integration of algorithms to search to summarize and organize retrieved results, with a manual approach to query building is the future. But he observes that the problems in designing controlled vocabularies to meet users needs and satisfy user expectations is a huge issue because of the diverse needs of the users of the Internet. Rosenfeld has observed that data is factual in nature while web contact is language. Unlike data in product databases, web content is textual, and the language of web sites is ambiguous. He has also observed that there are too many individual topics out there, and that it is exceedingly difficult to create controlled vocabularies and useful thesauri to cover all users' needs. He has surveyed the field and concludes that the chances of finding a silver bullet solution are slim. The prior art does not include any web sites using a search builder method of pre-arranged controlled vocabularies at all.

The conclusion is that there is no prior art that has refined and developed a query builder using pre-arranged controlled vocabularies and an advanced search interface to search engines and searchable databases for web results. Therefore it would be useful to provide an approach to improving word selection and the creation of more precise, detailed and on point search queries, and a system that can be used to quickly create, refine, and modify search queries for submittal to search engines and searchable databases, in an interactive online search.

SUMMARY OF THE INVENTION

The system generally operates in a distributed computing environment comprising individual computer systems interconnected over a network such as the internet, although the system could function equally well on a stand alone computer system.

In a preferred embodiment of the present invention, one or more servers are interconnected with a plurality of clients over an internetwork, and with a plurality of personal computers, over an intranetwork. The server systems include a memory (not shown), which is loaded into a server suite. The server suite provides the controls and functionality for an Internet service provider. For example, the server suite publishes web pages, thereby making each web page available to clients and PC's over the internetwork and intranetwork, respectively. In accordance with the present invention, the server suite further comprises a search builder program, web page, and user interface as further described hereinbelow.

The search builder program is coupled to a custom administrative program and database into which is compiled the information needed to operate the program. The form of the data structures used in these lists are further described hereinbelow. The search builder topics, word groups, word types, and search query word lists are entered individually as ordered lists.

The server is also interconnected to secondary storage which can comprise any form of conventional random or non-random access storage device, such as a hard rive, CD ROM or tape system with fixed or removable media, as is known in the art.

Each web page is accessed by end users via web browsers operating on clients' personal computers over the internetwork or on personal computers on an intranetwork. Each client and PC includes user interface devices, such as keyboards and monitors (not shown) as is known in the art, by which mouse clicks, types text and commands, search queries and other communications are input and search page results are output.

An exemplary example of a server system suitable for use with the present invention is an Intel Pentium based computer system having the following characteristics: 64 MB RAM, 1.0 GB hard drive, and network server connectivity. In the present invention, the server system is a proprietary server system suite written for and used exclusively by One World Telecommunications, Kennewick, Wash., which provides similar functionality to the Microsoft Windows NT Server Suite. The proprietary server system suite supports a simple page creation programming language that requires no knowledge of HTML programming or FTP uploads.

The foregoing aspects and many of the advantages of this invention will become more readily appreciated by reference to the following detailed description in conjunction with the accompanying drawings.

BRIEF DESCRIPTION OF THE DRAWINGS

FIG. 2 is a screen shot of web pages showing an organized list of search topics and search builders.

FIG. 4 is a screen shot of a typical search builder showing word groups and first word group controlled vocabulary selection and text box.

FIG. 7 is a screen shot showing the retrieved information from a search string query submitted to one of the search engines identified in the search engine listing page described in FIG. 5.

DETAILED DESCRIPTION

A system according to this invention generally operates in a distributed computing environment comprising individual computer systems interconnected over a network such as the Internet, although the system could equally function on a stand alone computer system.

In the present invention, one or more servers are interconnected with a plurality of clients over an internetwork, and with a plurality of personal computers, over an intranetwork. The server systems include a memory (not shown), which is loaded into a server suite. The server suite provides the controls and functionality for an Internet service provider. For example, the server suite publishes web pages, thereby making each web page available to clients and PC's over the internetwork and intranetwork, respectively. In accordance with the present invention, the server suite further comprises a search builder web page and user interface as further described hereinbelow, beginning with the reference to FIG. 2.

The search builder program is coupled to a custom administrative program and database into which contains the information needed to operate the program. The form of the data structures used in these lists are further described hereinbelow. The search builder topics, word groups, word types, and search query word lists are entered individually as ordered lists. The server is also interconnected to secondary storage which can comprise any form of conventional random or non-random access storage device, such as a hard rive, CD ROM or tape system with fixed or removable media, as is known in the art.

Each web page is accessed by end users via web browsers operating on clients' personal computers over the internetwork or on personal computers on an intranetwork. Each client and PC includes user interface devices, such as keyboards and monitors (not shown) as is known in the art, by which mouse clicks, types text and commands, search queries and other communications are input and search page results are output.

An example of a server system suitable for use with the present invention is an Intel Pentium based computer system having the following characteristics: 64 MB RAM, 1.0 GB hard drive, and network server connectivity. In the present invention, the server system is a proprietary server system suite written for and used exclusively by One World telecommunications, Kennewick, Wash., which provides similar functionality to the Microsoft Windows NT Server Suite. The proprietary server system suite supports a simple page creation programming language that requires no knowledge of HTML programming or FTP uploads.

The search builder of the present invention includes a method and system for creating improved search queries using pre-arranged controlled vocabularies, word groups, and word types. The search builder is a server-based program, which houses numerous individual topic oriented search builder modules. Each module is focused on a special topic of interest. FIG. 2 shows a list of topics as displayed by the server-based program when accessed by a user.

Each search builder module leads users through a series of word groups, where a user may select words to be added to a query, which will ultimately be sent to a search engine or searchable database. The goal of the sequence of steps is to create an intelligent query that contains a sequence of one or more words, which is called a search string. A simple search query contains one or more words. A "search string" is a series of words a user enters into a search engine. There is a first word, then a second word, then a third word, and so on. A user can put in any number of words, hopefully to match the information they are looking for. The search string then contains the words that a user will use to direct the search engine to find the web sites that contain relevant information. At each step, the user may choose from a list of pre-selected words, and/or may enter additional words of their own choice.

Using the search builder, the search string is created by selecting search words from search word groups, then adding additional search words from additional search word groups. The words in each word group have been carefully selected to improve the identification of relevant search results based on a defined understanding of human psychology and a carefully rationalized search and browse approach to scientific problem solving using the Internet and searchable databases.

The user may choose to add words to create a search string from as many word groups as is desired or needed to achieve relevant results to answer the users question or desire for information. The search string is created on a specific topical search builder and then submitted to a search engine of choice.

Each time a user adds a word to the search string the search engine looks through its database of indexed web pages for the web sites that contain the words listed. Generally, the more words that are used in the search query, the fewer pages will be found. Whenever the search engine finds a web page with the query word on the page, it saves the url or web page address and brings it back with a list of all the pages found with the search word, sorted according to the web sites criteria for relevance. A complex search with many words (e.g., 8 to 10 words) will retrieve fewer pages than a simple search (e.g., 2 to 3 words), because there are fewer web pages that have all the words in the search query.

The applicant has found that the best results are retrieved using words that were similar and related to the key search word or subject they were interested in. These different but related terms formed what he defined as a search string word group. The search string word group contains the key word as well as synonyms and related words that were similar in meaning that the user might be interested in.

For example, a student might be interested in finding scholarships on the Internet. The student would perform a search using the word "scholarships" in a search string. The student however, would also be interested in other similar types of financial aid. A short list of these other opportunities includes: Fellowships, Internships, Assistantships, Grants, Loans, Research assistantships, Teaching assistantships, Exchange programs, and so on. These words are all logically grouped into a search string word group applicant called "Money Words".

There are also many other word groups that are useful for finding scholarships: Personal characteristic word group, Age word group, Gender word group, and Education word group for example.

Applicant has recognized that there are many other search string word groups that could be used to research other intellectual avenues and areas of knowledge. Some of these words focus on "Knowledge" and include word groups and specific vocabularies that help people search for and identify web sites that improve your knowledge or skill through education or experience, which are termed "Learning words". Some of the "Learning Words" in the controlled vocabulary of this invention include Articles, Encyclopedia, Manual, Guide, Tips, Tactics, Strategy, and Tutorial.

When one selects and adds a "Learning Word" to a search string query, the search engine retrieves web pages that contain the "Learning Word", greatly improving the quality and educational content of the search results. Hence, when a user uses "Learning Words", significant improvements in searching education related queries can be achieved.

Applicant has recognized that one group of words, which are termed "Internet words" can be used to identify specific technologies or information delivery mechanisms associated specifically with the Internet. Internet Words developed since the Internet was created and became a uniquely commercialized advertising and marketing electronic telecommunications medium.

Similarly, there are other search string word groups that are useful to searching for people and organizations, for example: Association Word Group, Industry Word Group, and Government Word Group. To search for jobs information a user would select search words from the job, Career & Employment Word Group. To focus a search by education, grade level or age, a user would select words from those word groups. To search by location, a user would select from a Location Word Group listing various locations (e.g., cites, and states, regional, or countries). To search by date, a user would select words from a Date Word Group containing specific dates (e.g., month and year). To search for specific sources of information, the user would select words from a Source Word Group identifying the type of information source (e.g., government, companies, organizations, or educational institutions).

In addition to those listed, there are many more search string word groups that can be used to identify and pursue particular needs.

In the present invention, the search string word groups have been organized and color-coded into a pre-defined set of higher level "word types" to aid in learning and search skill development. In a preferred embodiment of the invention, there are seven categories of word types:

Subjects/Objects of interest (things—nouns)

Actions or Processes (verbs)

Features or characteristics of subjects/objects or actions/processes (adjectives & adverbs)

Knowledge Words (types of information, forms of information, and sources of information)

People Words (about people)

Location Words (places)

Domain Words (referring to the type of web domain—.com's, .edu's, org's, .gov's, etc.)

These "word types" are repeated as appropriate for consistency in each search builder module. The word types, word groups and the controlled vocabulary word choices in each word group vary with the topic of the search builder, and concomitantly with the appropriate and relevant terms, language and terminology used in the particular field of knowledge or expertise.

When a user creates a search string query, the user selects a query word from one controlled vocabulary for one word group, and then adds another word from another word group and so on. The word selection is varied to meet the user's particular needs or question. The user adds words in sequence, and creates a search string one word at a time, with a specific purpose, so that the search engine brings back results that are relevant and germane to the user's needs or interest.

The search builder allows a user to select from a word group that instructs the search engine to ignore results that contain selected domains or words. One such feature in the present invention is called "The Minus Dot Com Trick", in that when this word choice is selected by a user, the system inserts the search word "-.com" into the search string query. When processed by a search engine, the search engine will reject web pages that contain the word ".com". This greatly reduces the number of web sites returned, in that the dot com's, that is the web sites that typically sell products and services, are not included in the search results. This will greatly improve the trustworthiness and veracity of the information retrieved in a search, in that the results tend to then focus on web pages from non-commercial entities. Another domain word group selection further allows a user to focus alternatively on a specifically selected domain (such as the org's, .edu's, .gov's, or .mil's). This feature greatly speeds and focuses the search onto web pages from the user specified domains.

The search builder saves each additional word until the user is ready to send the search string to a search engine as in this example.

Search Builder: Scholarships Mini

| Word Group | Search Word Selected | Word Type |
|---|---|---|
| Money Word Group: | Grants | Subject Word Group: Theatre Subject |
| Learning Word Group: | Application | Knowledge |
| Internet Word Group: | Online | Knowledge |
| Excluded Domain Group: | Minus Dot Com | Domain |
| Included Domain Group: | Organization Domains Only | Domain |
| Six Word Search String Query: | Grants Theatre Online Application-.com .org | |

The search builder also allows the user to receive numeric color coded feedback on the nature of the word choices selected, based on an algorithm that is programmed individually into each search builder module, to maximize the relevance of results returned when the user initiates a search. This helps the user select an optimized number of words from an optimized number of word groups. The algorithm varies with the topical search builder.

Example using the above search string query (Grants Theatre Online Application-.com .org):

| Analysis: | Used | % | | Advice |
|---|---|---|---|---|
| Words In String: | 6 | | | OK |
| Word Groups: | 6 | 100% | | OK |
| Word Types: | 4 | 100% | | OK |
| Targeting: | | | | Excessive |

Each search builder module may be selectively programmed with either carefully selected commercial search engines or with carefully selected "invisible web resources", specialized searchable databases, with the syntax for each search engine programmed in a manner that is not plainly visible or ascertainable to the common user. The system strips out meaningless stop words automatically. The system converts simple language into advanced search queries automatically.

The search builder allows users to clear all search strings in progress and start again. The search builder also allows password enabled users to save numerous searches. This system allows the user to use a search builder to create a search string, save the search builder configuration created, and return at a later time, and retrieve the search builder parameters exactly, and continue on to do more search string building.

Search builders are developed with appropriate word groups and controlled vocabularies by the system owners on topics of wide and common interest, as well as on narrower topics of interest to technical vertical markets or user groups.

Each search builder allows users to create search queries to canvas a segment of the subjects and topics, actions or processes, skills or capabilities, or other aspects of importance to users interested in that topic.

Each search builder topic, each word group in each search builder topic module and each associated controlled vocabulary is identified and created with a particular user group in mind.

Each word group and controlled vocabulary content is selected to provide problem solving or education, or skill improvement information, or to allow people to perform searches to identify opportunities, or key contact information.

The present invention then provides a method and system for creation of the of improved search queries. To improve the speed and relevance of retrieved results, certain user needs were designed into the system. The search builder modules offer users assistance in the selection of words and represent a new alternative to the blank text box.

The invention assists users in defining what they want. Carefully selected search builder topics, pre-arranged vocabularies, word groups, and word types help user select good words to answer certain problems or address certain needs. The user is focused on the controlled vocabularies. These are the source for the terms used in search queries. The system converts simple language into advanced search queries, and thereby derives improved responses from the search engines. The system strips out meaningless stop words, and saves the users time needed to address search engine nuances. The use of the present invention will contribute to users deriving better results from using search engines. Users will retrieve information that can educate them and thereby enhance their knowledge, skills, and abilities faster and easier.

Figure 1:
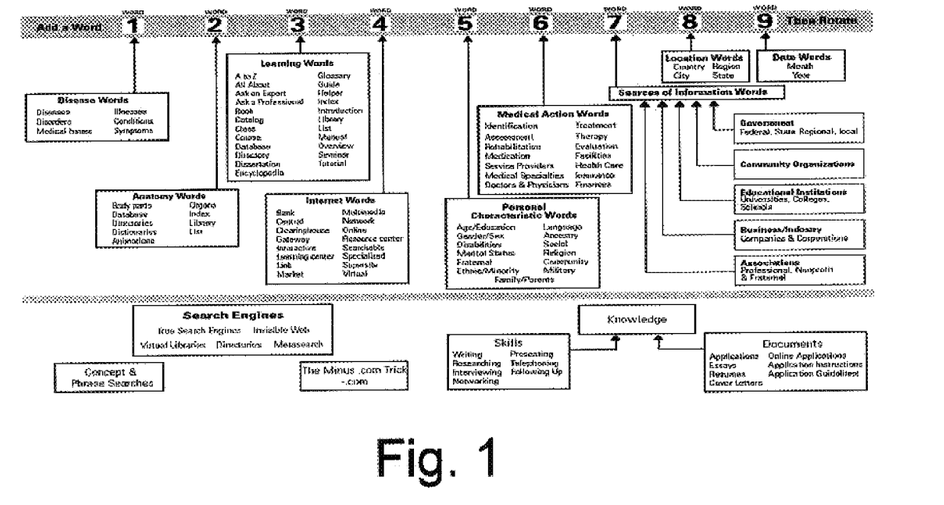
FIG. 1 is a block diagram of the system for organizing word groups and controlled vocabularies for use as a system for the creation of improved search queries based on the description of the present invention.

FIG. 1 is a graphical representation of the overall organization of the search builder for use in developing search queries for health-related searches.

FIG. 2 is a screen shot of web pages showing an organized list of search topics and search builder. The user clicks on the name of a search builder topic to initiate search string creation using that particular search builder module.

Figure 3A:
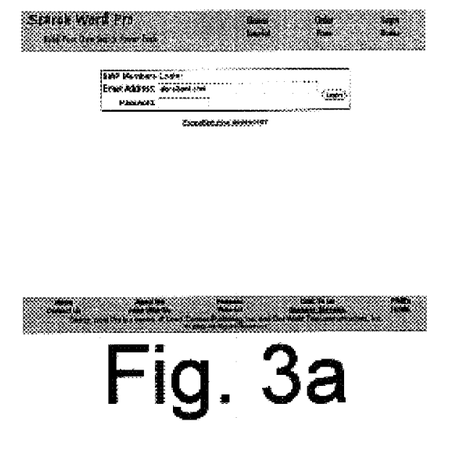
FIGS. 3a and 3b are screen shots of membership and password web pages.
Figure 3B:
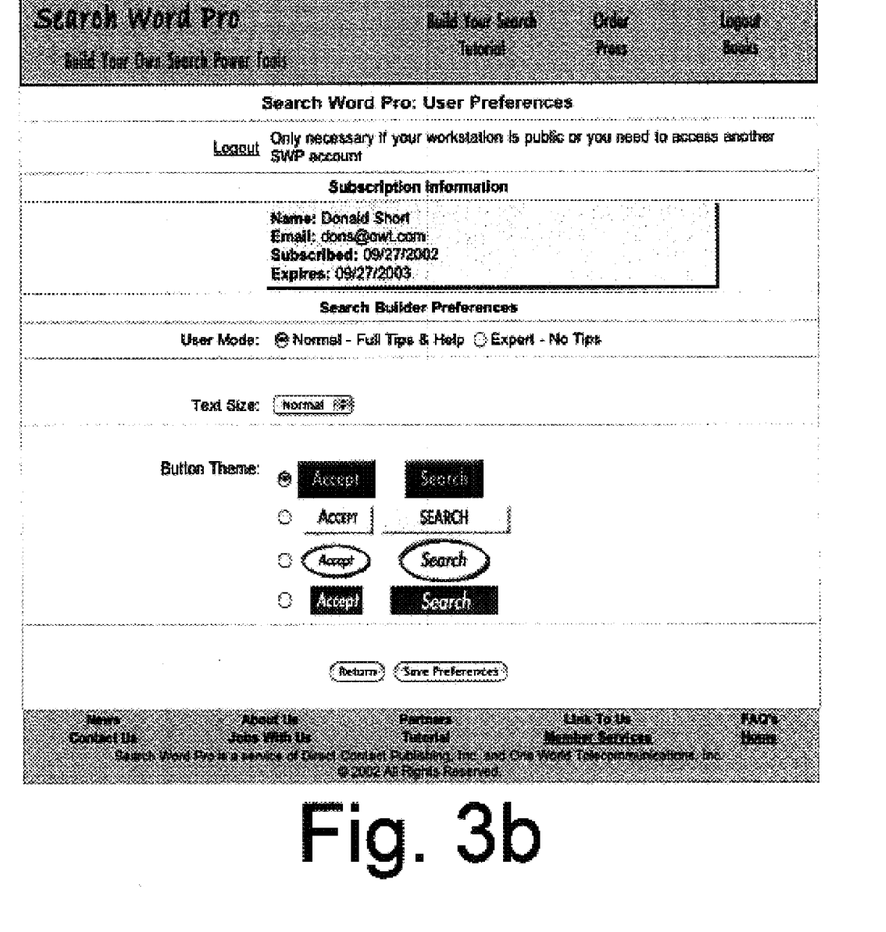

FIGS. 3a and 3b are screen shots of membership and password web page. If the user is a member, the user enters his or her user name and password to get access to the password protected portions of the invention.

FIG. 4 is a screen shot of a typical search builder showing the word group choice for the particular search builder module and first word group controlled vocabulary selection and text box.

The user will click on a word in the controlled vocabulary list to select it or enter a word of their own choice that better describes what they are searching for. Upon clicking on the word in the controlled vocabulary, the selected search word appears in the "Current Selection" text box. Once a word has been selected or entered into the "Current Selection" text box, the user clicks on the "Accept" button. The user may click on the "Clear" button to remove any search words that are in the "Current Selection" text box. The user may return to this word group and controlled vocabulary by clicking on the title of the word group. The user may also go to any word group by clicking on the title of that word group.

Depending on the search builder module, there will be a certain number of word groups presented. Each word group operates in accordance with the process described herein with reference FIG. 4. A user continues to select word groups, and then selects or enters search words and then clicks on the "accept" button. Each time a user clicks on the "Accept" button, the search builder adds the selected word to the search string query, and saves it for submittal to a search engine. The search string query is displayed on the search builder page immediately after the user clicks on the "Accept" button. The word is color-coded to identify the word type.

There are seven general categories of word types:

Subjects/Objects of interest (things—nouns)

Actions or Processes of interest (verbs)

Features or characteristics of subjects/objects or actions/processes (adjectives & adverbs)

Knowledge Words (types of information, forms of information, and sources of information)

People Words (about people)

Location Words (places)

Domain Words (referring to the type of web domain: .com's, .edu's, org's, .gov's, etc.)

Figure 5:
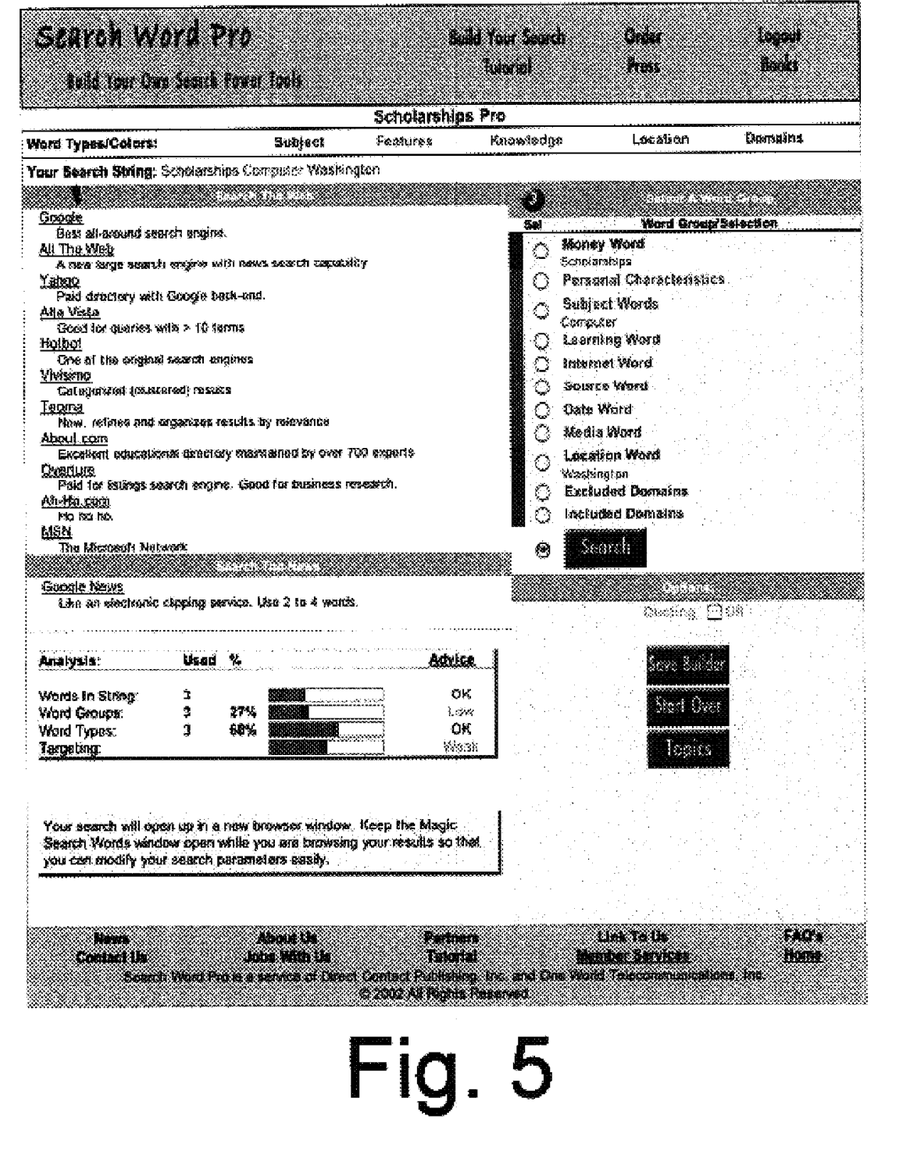
FIG. 5 is a screen shot showing the search engine listing page.

Upon completion of the search string query, the user clicks on the "Search" button to open up the search engine listing page.

Figure 6:
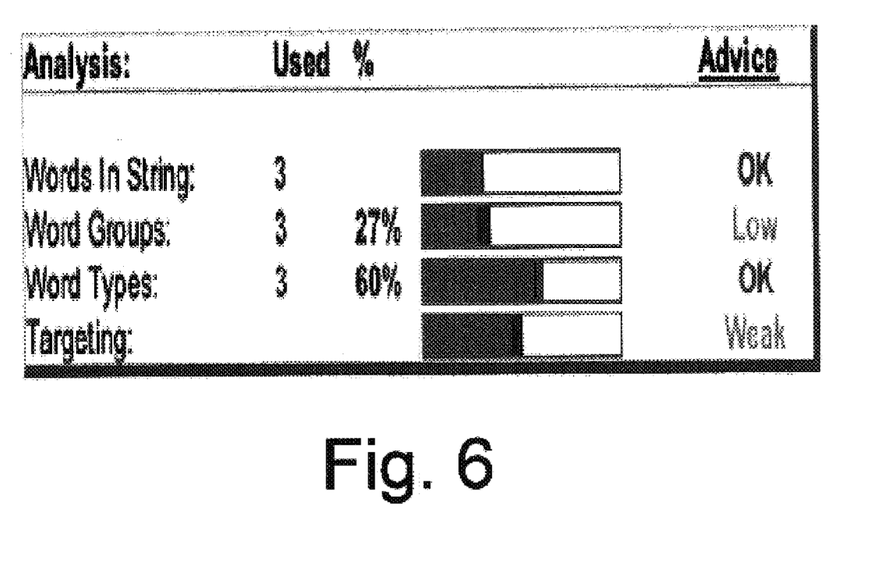
FIG. 6 is a screen shot showing the Word analysis section of the search engine listing page.

FIG. 5 is a screen shot showing the search engine listing page. The user clicks on the name of a search engine to initiate the search request on the search engine selected. The search builder transmits the search string query to the search engine selected with appropriate syntax to return results with heightened relevance. The Search results responsive to the search engine requests opens up in a new window. FIG. 6 is a screen shot of the search results retrieved from a search directed to one of the search engines illustrated in FIG. 5. The user then browses the results to find the information they were searching for.

FIG. 6 is a screen shot showing the search word analysis section of the search engine listing page. The user receives numeric color coded feedback on the nature of the word choices selected, based on an algorithm that is programmed individually into each search builder module, to maximize the relevance of results returned when the user initiates a search. This helps the user select an optimized number of words from an optimized number of word groups. The algorithm varies with the topical search builder. If the feedback indicates the number of words, type of words, or number of word groups is too low or too high, the user is prompted to modify his search word query.

FIG. 7 is a screen shot showing the search word analysis section of the search engine listing page. The user receives numeric color coded feedback on the nature of the word choices selected, based on an algorithm that is programmed individually into each search builder module, to maximize the relevance of results returned when the user initiates a search. This helps the user select an optimized number of words from an optimized number of word groups. The algorithm varies with the topical search builder. If the feedback indicates the number of words, type of words, or number of word groups is too low or too high, the user is prompted to modify his search word query.

The user may close down the search engine response and return to the search builder search page listing. The user may click on the "Clear and Start Over" if they wish to create a completely different search string query. The user may click on a particular word group and select a new, different or related search word from the controlled vocabulary in the word group of their choice. The may then click on the "search" button, and request more search results. Users will create a search string from word groups, search and browse their results, and return to modify their search string, and browse again, and so on, until they succeed in finding what they are looking for or give up.

If the user is a password member, the user may click on the "Save Search" button if they wish to save the entire search builder configuration for a later time. The user may click on either the "Search" button in the top toolbar or the "Topics" buttons in the word group selections to return to the "Search Builder Topic" page, where they can choose a different search builder.

Figure 8:
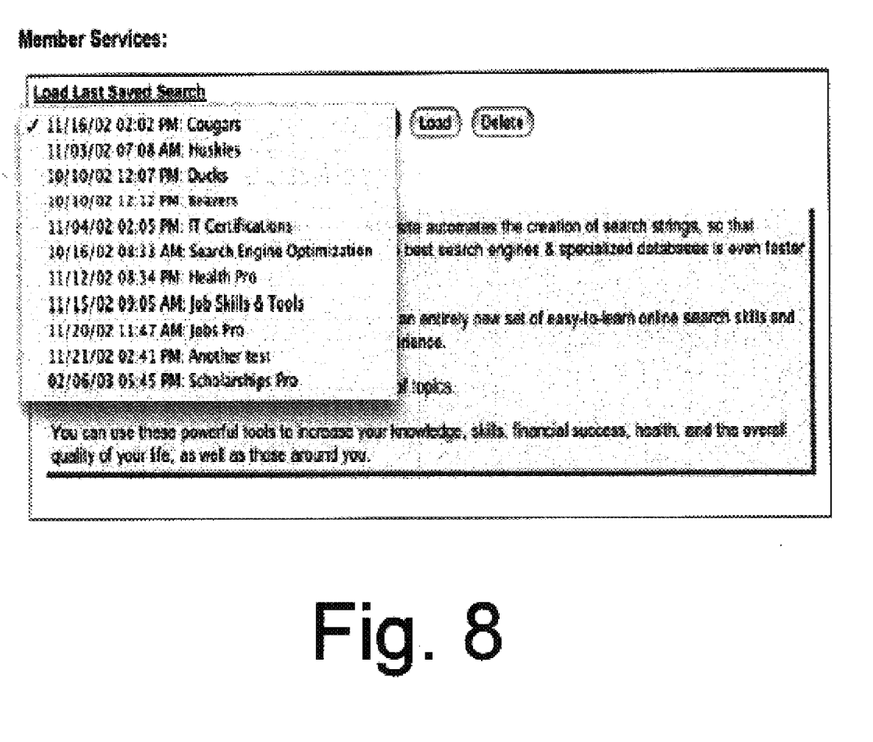
FIG. 8 is a screen shot showing the save search feature of the search engine.

FIG. 8 is a screen shot showing the Last Saved search and Save search archive on the Search Builder Topics Page. This display is only visible to password carrying members upon proper log in and authentication. The password carry member may log in, and may return click on the "Load Last Saved Search" or click on one of the prior saved searches on the Search Builder Topics page.

Although this invention has been described in terms of certain preferred embodiments, other embodiments that are apparent to those of ordinary skill in the art are also within the scope of this invention. Further, although the present invention has been described in terms of various embodiments, it is not intended that the invention be limited to those embodiments. Modification within the spirit of the invention will be apparent to those skilled in the art. For example, the search builder modules may be exported onto other web sites for purposes of providing the special improved search query capabilities to a private intranet, not available to the plurality of users who can access the Internet. Also various commands beyond a key board or a mouse, may be utilized by a user to transmit the commands needed to utilize the search builder modules, or to make search word group and search word selections. For example, a voice command may be used instead of a mouse click.

Although the described embodiment uses the search topics, word groups and controlled vocabularies described herein, the invention can be applied to any topic, body of knowledge or subject of interest and will be equally applicable to the creation of improved queries in those areas. The invention may be applied to web browsers and computer systems other than those that are in existence today as well as to search engines or searchable databases beyond those in which the invention is currently applied.

While the preferred embodiment of this invention has been illustrated and described, it will be appreciated that various changes can be made therein without departing from the spirit and scope of the invention.

In the claims described herein, reference characters used to denote process steps are provided for convenience of description only, and not to imply order for performing the steps.

What is claimed is:

1. A method for creating a search string using a computer system, the computer system having a processor, a display, and a browser, the computer system programmed with a server-based program called a search builder, the method comprising the steps of:

selecting a search topic;

defining a plurality of word categories related to the search topic;

forming a word group for each word category;

populating each word group with a plurality of preselected words within the word category, each of the plurality of words within each word group selected to vary the scope of a search relative to the remaining words in the word group;

generating a first search string by selecting a first word from each of a plurality of the word groups to create a search string;

transmitting the first search string to a search engine;

receiving a first data set from the search engine;

graphically displaying an analysis of the first search string based on the number of words in the search string, the number of word groups selected, the number of word types selected, and an index of the targeting of the search words selected;

creating a second search string by replacing the first word of a first word group of the first search string with second word from the first word group;

transmitting the second search string to the search engine;

receiving a second data set from the search engine; and, graphically displaying an analysis of the second search string based on the number of words in the search string, the number of word groups selected, the number of word types selected, and an index of the targeting of the search words selected.

2. The method of claim 1 wherein the step of selecting a search topic includes the steps of:

depicting on the display at least one search topic;

the user selecting the search topic from the at least one search topic; and, responsive to selection by the user of the search topic displaying a plurality of pre-selected word groups.

3. The method of claim 2 wherein the step of generating a first search string comprises the steps of:

displaying a plurality of word group headings to the user;

the user selecting a first word group heading;

displaying the pre-selected words populating the first word group to the user;

the user selecting a first word from the first word group;

entering the first word from the first word group into a first search string;

displaying the plurality of word group headings to the user;

the user selecting a second word group heading from the plurality of displayed word groups;

displaying the pre-selected words populating the second word group;

the user selecting a first word from the second word group; and, adding the first word from the second word group to the first search string.

4. The search builder display method described in claim 1 which further comprises the step of displaying the search word types in selected color codes and in text.

5. The search builder display method described in claim 4 where the step of displaying the word types includes displaying standardized terms identifying each word type, the terms selected from the group consisting of a subject, action, feature, knowledge, location, date and domain.

6. The search builder display method described in claim 4 wherein the the step of displaying the search word types in selected color codes and in text includes displaying the search groups color coded to the word types.

7. The search builder display method described in claim 1 wherein the step of displaying the pre-selected words in a group to the user includes displaying pre-arranged controlled vocabulary drop down menus for each word group.

8. The search builder display method described in claim 1 wherein the step of entering the first word from the first word group includes displaying the first word in a text box and in the display associated with the word group.

9. The search builder display method described in claim 1 wherein the step of selecting a first word from the first word group includes selecting an accept button which enters the first word into a search string.

10. The search builder display method described in claim 1 which further comprises the step of displaying a clear button which when clicked deletes words in the text box.

11. The search builder display method described in claim 1 which further comprises the step of displaying a selected search word includes displaying the selected search word in a sequence of words color coded to correspond to the word group from which the selected search word was selected.

12. The search builder display method according to claim 1 further comprises displaying a topics button that when selected displays a list of the available search topics.

13. The search builder display method described in claim 1 which further comprises the step of displaying a search button which when clicked displays a color coded search string comprised of at least one selected word and a list of pre-selected search engines or searchable databases.

14. The search builder display method described in claim 1 which further comprises the step of displaying a clear and start over button which when selected displays a list of pre-arranged search engines or searchable databases.

15. The search builder display method described in claim 1 which further comprises displaying a Save Search button which when selected saves a search string builder configuration and search word query.

16. The search builder display method described in claim 15 which further comprises displaying a Load Last Saved Search button and a text box containing Saved Searches, the Load Last Search button operable to enter a saved search word query into a text box.

* * * * *